United States Patent [19]

Wang et al.

[11] Patent Number: 4,587,633
[45] Date of Patent: May 6, 1986

[54] MANAGEMENT COMMUNICATION TERMINAL SYSTEM

[75] Inventors: An Wang, Lincoln, Mass.; Stanley B. Fry, Wilton, N.H.; Shu K. Ho, Carlisle; John M. Smutek, Billerica, both of Mass.

[73] Assignee: Wang Laboratories, Inc., Lowell, Mass.

[21] Appl. No.: 440,668

[22] Filed: Nov. 10, 1982

[51] Int. Cl.[4] .............................................. G06F 3/14
[52] U.S. Cl. .................................. 364/900; 364/514; 364/521; 358/256; 340/720; 340/747
[58] Field of Search ... 364/200 MS File, 900 MS File, 364/521, 515, 514; 340/703, 721, 745, 747, 798, 310 R, 700, 720; 358/256, 285, 294, 296

[56] References Cited

U.S. PATENT DOCUMENTS

| | | | |
|---|---|---|---|
| 4,070,710 | 1/1978 | Sukonick et al. | 364/900 |
| 4,094,000 | 6/1978 | Brudevold | 364/900 |
| 4,103,331 | 7/1978 | Thacker | 364/200 |
| 4,121,283 | 10/1978 | Walker | 364/200 |
| 4,204,208 | 5/1980 | McCarthy | 364/900 |
| 4,213,124 | 7/1980 | Barda et al. | 340/721 X |
| 4,348,739 | 9/1982 | Deaver et al. | 364/900 |
| 4,375,079 | 2/1983 | Ricketts et al. | 364/900 X |
| 4,404,649 | 9/1983 | Nunley et al. | 364/900 |
| 4,424,572 | 1/1984 | Lorig et al. | 364/900 |
| 4,429,372 | 1/1984 | Berry et al. | 364/900 |
| 4,454,576 | 6/1984 | McInroy et al. | 364/200 |
| 4,454,577 | 6/1984 | Costantini et al. | 364/200 |
| 4,464,733 | 8/1984 | Misker et al. | 364/900 |

Primary Examiner—Raulfe B. Zache
Assistant Examiner—William G. Niessen
Attorney, Agent, or Firm—Michael H. Shanahan

[57] ABSTRACT

A management communication terminal is formed by integrating an electronic, raster scanning camera with a personal computer. The terminal has a keyboard, a Winchester disk drive, a telecommunication controller, a cathode ray tube monitor, and a thermographic, raster image printer. Two such terminals define an office information system for the exchange of information produced at the keyboards and by the cameras. In each terminal, the coded data generated at the keyboard and the raster image data generated by the camera are temporarily stored in separate data buffers and from there are routed to the monitor, the printer and disk storage. The monitor and printer are able to display and print respectively, images created from the keyboard data, the camera data or a combination of the two. The camera data is compressed prior to storage and is reduced in resolution prior to application to the monitor. The telecommunication controller, when coupled to a transmission line, transfers keyboard and camera data directly between the disk memories associated with two terminals.

17 Claims, 7 Drawing Figures

|  DOC  | T/G | TITLE | AUTHOR | DATE |
|---|---|---|---|---|
| ☐ 22a | T 23a | T-1 | E-1 | 1/1/82 |
| ☐ 22b | T+G 23b | T-2 | E-2 | 1/2/82 |
| ☐ 22c | G 23c | G-2 | E-1 | 1/5/82 |
| ☐ 22d | T 23d | T-3 | E-1 | 1/10/82 |
| ☐ 22d | T+G 23e | T-4 | E-1 | 1/12/82 |

MANAGEMENT COMMUNICATION TERMINAL SYSTEM

BACKGROUND OF THE INVENTION

This invention relates generally to method and apparatus for office information systems and more specifically to communication terminals having a raster image scanner and being capable of dealing with the combination of text and graphic images created with structured and unstructured data.

Office information systems include computers and associated peripherals such as monitors, e.g. a cathode ray tube (CRT), mass storage devices such as disks, and printers to keep track of, to manipulate and to distribute information necessary to the activities of a given office. Typically, these systems deal only with structured, i.e. coded, digital data to represent the information. Text and (synthesized) graphic information displayed on a monitor or printed out by a printer are created solely from structured data.

A daisy wheel printer is an example of a printer than can create only limited images and it does so from structured or coded input data. In contrast, a CRT monitor and a matrix pin printer create images in a raster pattern made up of a plurality of rows of pixels or points on the screen or a page of paper each of which must be represented by a binary bit to represent an "on", i.e. glow state for a given pixel on the monitor screen or the "dot" for a given pixel on a piece of paper in the printer. The pixel on the monitor screen may also have a plurality of intensity levels but that dimension is not relevant to the present discussion.

Structured or coded data applied to a CRT or a matrix pin printer requires that the code be translated by a local character generator into a family of binary bits or data that represent the "on" or "off" status of the number of pixels and rows needed to create the image represented by the code. Coded data applied to a daisy wheel serial printer merely requires that the character on a given pedal of the daisy wheel be positioned under the printer hammer in response to the code for the given character.

As used herein, digital or binary data that represents the "on" or "off" (or "dot" or "blank") status of all the pixels in the raster—or a portion of the raster—is unstructured or uncoded data.

Hereafter, the term "text data" is intended to mean structured or coded data representing an image to be created at either or both a monitor and printer. Text data is an appropriate term for coded data because a large portion of the coded data in an office information system is likely to be English prose—or another language—as distinquished from graphics. However, it is also meant to include data representive of any information symbols such as mathematical expressions and geometric line segments, an arc and a curve.

The term "graphic data" is intended to mean unstructured data representative of the binary bit pattern associated with a raster image. This term is appropriate for unstructured data because it conveys the idea of being related to a picture, handwritten prose, a chart or graph or the like which logically would be appropriate for being scanned by a camera.

The reader should understand, however, that text data can represent graphic information but it will be in a structured data form and graphic data can represent printed prose if that is the information put in front of the raster scanner.

Prior to this invention, raster scanning devices that generate unstructured data, e.g. the vidicon tube of a television (TV) camera and charge coupled device (CCD) arrays with scanning optics, have not been integrated into office information systems. The complexity of dealing with the unstructed data produced by the scanner was understood to require too great expenditures of money to make the integration of a camera into the system economically feasible. As explained, monitors and printers typically found in office information systems respond only to structured input data. The communication time required to transmit information represented by unstructured data is much greater than that for information represented by coded data which is another inhibiting factor. Most significantly, no one perceived the present system configuration or its ability to make a highly effective use of a scanning camera and its graphic data.

The publishing industry has used computers and monitors to edit materials prior to publication but their systems are not office information systems. The publishing systems are not interactive communication tools but rather are used to make printing masters that include both text information, i.e. prose, and graphic information, i.e. a facsimile of a photograph. The requirements of a publishing system differ greatly from that of an office information system. For one, the image resolution requirements, expressed in terms of pixels per inch (ppi), of the publishing system are economically inappropriate for a real-time, interactive, office information system. The scan rate in a publishing system is generally inappropriate and the required graphic data storage for too excessive for an office information system. Also, a document need not be displayed while it is being transmitted to a remote station when the purpose is photographic plate or master making.

Office systems have needed a terminal suited in particular for the manager or executive. Managers continually communicate with their peers and subordinates. A good portion of their communications are over the telephone and often a document necessary to the conversation exists in the hands of only one of the callers. In addition, information in digital form on a word processing system or in a personal computer would be helpful to the conversation but there is no appropriate means for transmitting it between terminals in real or near real time. The callers, of course, would have no way of modifying or blending transmitted text data with graphic data in a manner helpful to a phone conversation between the users of the terminals. Also, there is a need to store both graphic and text data at remote devices for rapid retrieval and review.

SUMMARY

Accordingly, it is a principal object of this invention to devise a communication terminal having a graphic data generator, i.e. a camera, being capable of exchanging text and graphic data with a remote device and being capable of having a display and a print out of composite images created from text data and graphic data residing in either or both the local or remote device.

It is also a main object of this invention to make a communication terminal for an office information system that includes a raster scanning input device for generating graphic data for display, storage, transmission to another terminal and for printout of images that include both text and graphic information, i.e. information represented by text and graphic data.

Another object is to define a highly effective configuration for a communicating device having a raster scanning input ability and that is technically and economically viable for the office environment, suited for business order entry applications, and suited for remote storage and retrieval of text and graphic data.

Another prime object of the invention is to integrate a raster scanning device, specifically a charge coupled device (CCD) linear array with scanning optics or a self scanning array, with a communicating personal computer to significantly expand the capabilities of the computer to the point that a unique communication product is defined for office information systems.

Still another object of this invention is to significantly reduce the complexity of the foregoing defined communication terminal by segregating text and graphic data within the communication teminal until it is outputted to a monitor or display and to leave it segregated for communication between terminals.

Another object of this invention is to design the above communication terminal to use temporary storage buffers for both text and graphic data for entry of the data into the terminal and entry and exit of data into and out of long-term storage means to simplify the terminal without sacrificing performance.

A further object directed at simplifying the foregoing communication terminal is to reduce the resolution of the graphic data for display only. This means that graphic data can be displayed at a resolution lower than the resolution at which it is printed or long term stored. The low resolution graphic buffer gives the operator the choice to view the graphic information at one resolution on the monitor or at a second higher resolution via the printer. This arrangement enables the terminal to have a lower cost but without totally sacrificing a desired resolution.

Yet another object directed toward defining the above communication terminal in a fashion to make it suited for the office is to establish communications between two terminals to direct transfer of text and graphic data between long term storage at the terminals.

Consistent with the foregoing, it is also an object to compress the graphic data before storing it in the long-term storage means and before transmission to a remote device.

The foregoing and other objects of the present invention are realized by integrating a CCD camera, i.e. a graphic data generator, with a personal computer and by further including the necessary memory capacity for buffer storage, a Winchester disk drive for long term storage, a communication controller for terminal to terminal transmissions and a thermographic printer capable of producing a raster image print out. The text and graphic data handled by the terminal is never merged in the terminal except when being applied to a monitor for display or to a printer for making a hard copy. The terminal remembers when a given document is made up of a composite of separately stored text and graphic data.

DESCRIPTION OF THE DRAWINGS

The foregoing and other objects and features of the present invention are apparent from the specification, the drawings and the two taken together. The drawings are.

THE DESCRIPTION

Figure 1:
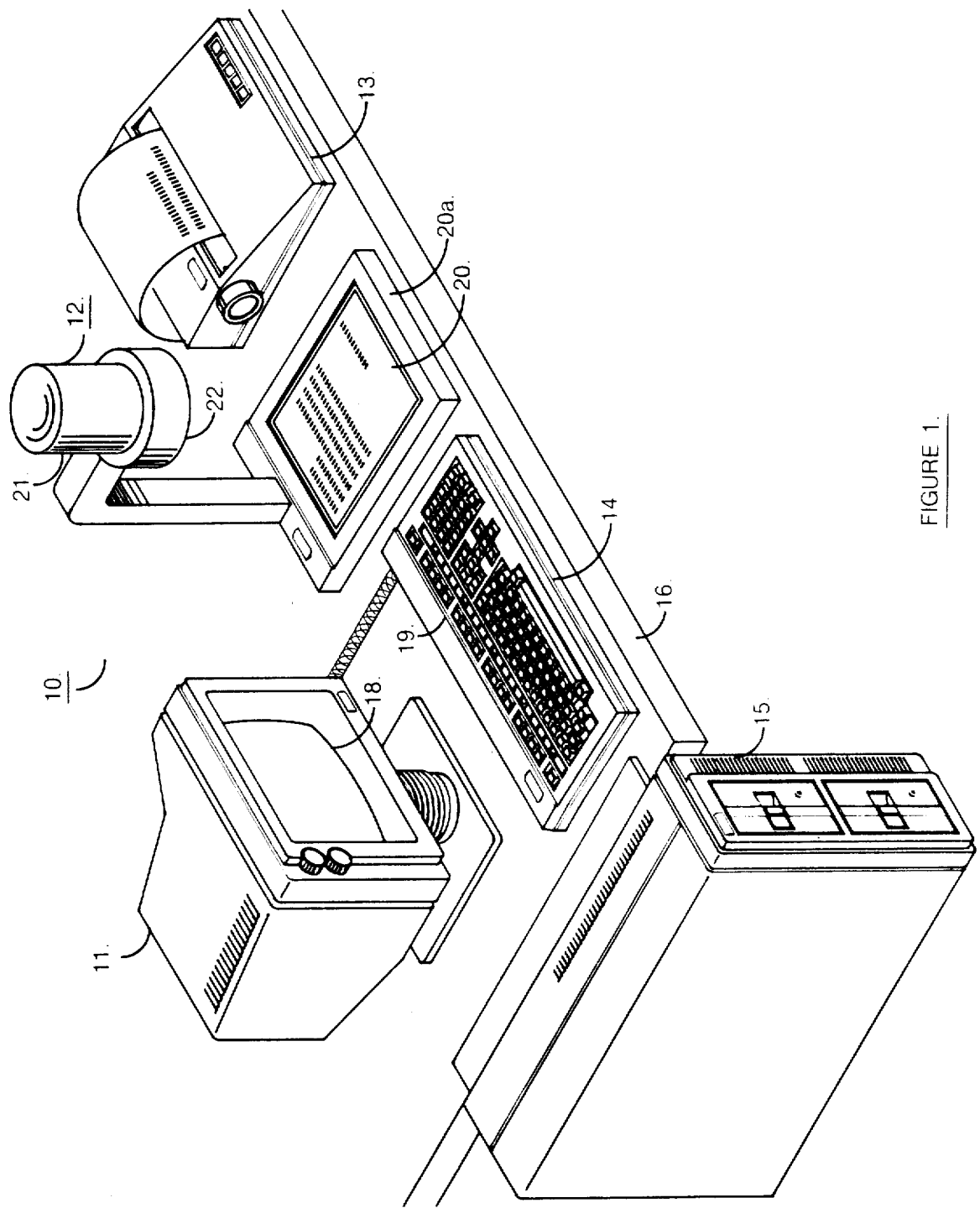
FIG. 1 is an isometric drawing of a communication terminal according to the present invention.

Apparatus 10 in FIG. 1 is the communication terminal according to the present invention and it is made up of a monitor 11, camera assembly 12, printer 13, keyboard 14, and console 15. The numbered items are all shown supported on a table top 16. The cabling interconnecting the various items is not shown but should be understood to be present.

The terminal 10 includes a small digital computer that has been modified to create the communication terminal. The computer selected for the modification is the "Professional Computer" available from Wang Laboratories, Inc., Lowell, Mass. 01851, the assignee of the present invention.

The monitor 11, keyboard 14 and console 15 are the standard components of the computer and the camera assembly 12 and graphic data printer 13 are part of the components added to make the computer into a communication terminal. The interface circuitry, device controllers, expanded memory and communication controller and other parts that make up the terminal (discussed below), are housed in console 15 along with the circuitry for the computer.

Two or more of the communication terminals 10 make up an office information system.

The operation of the present communication terminal will now be described broadly. An executive E-1 using a communication terminal C-1 calls an executive E-2 who has a communication terminal C-2. The phone call is made over an independent communication channel. Using appropriate function keys at this keyboard 14, operator E-1 displays on his screen 18 an image of a document T-1. Document T-1 is represented by text data only and it and several other text data documents are stored by the disk memory at his terminal C-1. Executive E-2 asks to see document T-1. Responding to the request, executive E-1 causes the text data T-1 to be transmitted to terminal C-2 where it is stored in available space in that terminal's disk memory as document T-1. Terminal C-2 makes a notation that the document is a foreign generated document and records the name and terminal address of the sender.

Executive E-2 fetches text data T-1 from his disk and displays it on his screen 18. He decides to add a line graph to the document. Executive E-2 clears his display screen (optionally) and places a sheet of clean paper 20 on pad 20a of the camera assembly 12 and draws a graph which will be referred to as document or graph G-1. The camera scans graph G-1 generating graphic data G-1 which is routed to disk memory and displayed on screen 18 of terminal C-2. Executive E-2 views the display of graph G-1 to verify that he had the graph appropriately aligned relative to the camera 21 and to verify that the graphic data G-1 produces a legible display. He then displays the graph G-1 along with the original memo T-1 thereby creating a document T-2=T-1+G-1. The text data T-1 takes precedence over the graphic data G-1 when there is overlap of images on the display.

At this point, executive E-2 manipulates the keyboard 14 to command that the composite image T-2=T-1+G-1 be transmitted from terminal C-2 to terminal C-1. Terminal C-2 makes a notation in header data that document T-2 is a composite image formed from documents T-1 and G-1. The header is transmitted first followed by the text data and then any graphic data. The data transfer occurs directly between the disk memories in the two terminals. In this situation, terminal C-2 observes that text data T-1 originated at terminal C-1 so it transmits a message in place of data that text data T-1 at terminal C-1 is to comprise one of the two components of document T-2. Had the text data originated at terminal C-2, or some other terminal other than C-1, the actual text data is transmitted. The transmission of the message instead of data means a savings in transmission time and storage space on the terminal C-1 disk.

The text data T-1 at the time of its creation and storage on disk was assigned a file name by executive E-1 and that name was added to a file index maintained by terminal C-1. Similarly, document T-2 was assigned a file name by executive E-2 at the time of its creation and the name was added to the file index in terminal C-2. The name for T-2 was transmitted to terminal C-1 and added to its file index as the name of T-1 was added to the file index of terminal C-2 following its transmission. The file name and other header information is stored with the text data when composite images are created. When either terminal C-1 or C-2 calls up a display of document T-2, it proceeds to the memory location for the document T-1 and then to that for document G-1.

Further creations and transmissions of text and graphic data take place between terminals C-1 and C-2 as the two executives E-1 and E-2 see fit as part of their phone conversation. In addition, text data, graphic data or composite data can be transmitted between terminals without attendance by the executives by putting the terminals into a receive mode. Also, data can be transmitted to remote data storage means for subsequent use, at least in a limited fashion by devices other than terminal 10. The originating terminal can retrieve its data for its own use or it can be retrieved by another terminal 10.

Figures 6A, 6B:
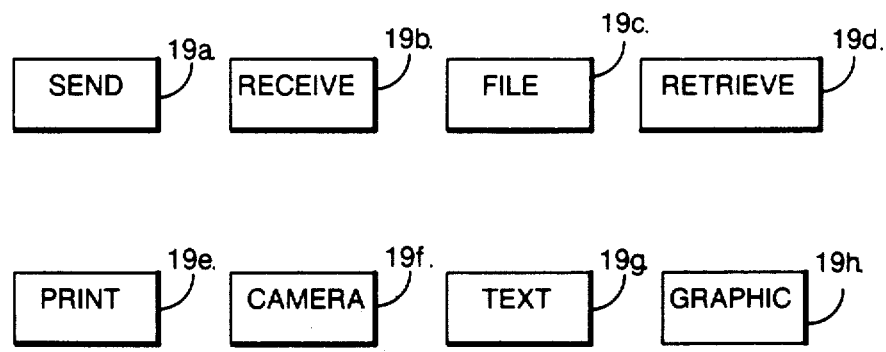
FIG. 6a is an illustration of a sample file index displayed on the screen of a monitor at a terminal showing one embodiment of a format for the file index.
FIG. 6b is an illustration of some of the function keys on the keyboard of FIG. 1.

The foregoing can be briefly reviewed and further appreciated by reference to FIGS. 6a and 6b. An image of a sample file index that might appear on executive E-1's CRT screen 18 is shown in FIG. 6a. Function keys 19 a–h on keyboards 14 used by executives E-1 and E-2 are shown in FIG. 6b.

The file index image in FIG. 6a is made up of five columns under the five headings: DOC for document; T/G for text/graphic; TITLE for the name of the document; AUTHOR for identifying the source of the document; and DATE for the date the document is added to the file index.

There are five selection boxes 22 a–e in the DOC column associated with the file index of FIG. 6a. Boxes a and b go respectively with documents T-1 and T-2 created by executives E-1 and E-2 in the above example. All dates associated with the documents in the DATE column are arbitrarily selected to represent the date the document was added to the file index. The remaining documents G-2, T-3 and T-4 associated respectively with boxes 22 c–e, are additional documents established by executive E-1.

The screen 18 initially displays a formatted message or menu to enable the terminal user to select from a field the present system with its ability of handling both text and graphic data.

Having selected the present system, the terminal is in its basic mode which is a text document creation mode. This simply means that a typist may create a text document and obtain a display of it on screen 18 by actuating the alpha-numeric keys on keyboard 14. When the document is completed, it is added to the file index such as that shown in FIG. 6a by actuation of the FILE key 19c. A formatted message appears on the screen requesting the operator to type in the title and name of the author or other identifying information. The terminal automatically adds a "T" into a T/G block 23 indicating the document is made up of text data only. This is done when the EXECUTE key (not shown) on the keyboard 14 is pressed. The terminal thereafter reverts back to the text document creation mode. Further text documents are subsequently created and added to the file index as above.

To create a document from graphic data, the operator pushes the CAMERA key 19f. A formatted message appears on the CRT screen requesting the operator to type in the title and author information. The terminal automatically adds a "G" into T/G block 23 indicating the document is made up of graphic data only. This is done when the EXECUTE key is actuated. Next, the operator presses a SCAN key (not shown) to actuate the camera 21 to proceed through a scan of target 20 to generate graphic data representative of a raster image of the target. As the graphic data is being generated it is stored in a buffer memory and displayed on screen 18, a half page at a time. If the operator is satisfied with the displayed image, the FILE key 19c, or the EXECUTE key, is pressed and the graphic data is stored in disk memory.

A composite document is created by getting it onto the file index. For example, document T-4 associated with selection box 22e in FIG. 6a was created from text data document T-3 and graphic data document G-2. The RETRIEVE key 19d is pushed to bring up the file index onto screen 18. The cursor is a mark, i.e. image, on screen 18 that identifies a character location on the screen to the user. It is moved around the screen by up, down, right and left CURSOR keys (not shown) on keyboard 14. The cursor is moved to selection box 22d and the EXECUTE key is pressed. This causes the image created from text data for document T-3 to appear on screen 18. The RETRIEVE key 19d is pushed again to get the file index back on the screen and this time the cursor is moved to selection box 22c. Pushing the EXECUTE key results in the image created by the graphic data for document G-2 to be displayed along with the image of document T-3. The terminal permits the composite display to occur when the previously retrieved image was made from different data. In this case, the graphic data image followed a text data image.

If a third graphic data image is retrieved, the previously created composite image is lost. To preserve the composite image, the FILE key 19c is depressed. This brings up a formatted message that asks for the title, T-4, and author, E-1, information to be typed in. The data is automaticallyt entered and "T+G" is automatically written into the T/G block. Pressing the EXECUTE key at this point causes the document T4 to be added to the file index. T-4 is made up of text data T3 and graphic data G-2.

From this point on, the composite document T-4 may be displayed by pressing the RETRIEVE key 19d, moving the cursor to selection box 23e and hitting the EXECUTE key. The viewer can alternately blank and bring back the text and graphic data images by using the TEXT and GRAPHIC keys 19g and 19h. Pushing the TEXT key while the composite image T-4 is being displayed causes the text data image to be blanked, i.e. to go away leaving only the graphic data image. Pressing the TEXT key a second time brings back the text data image thereby reconstructing the composite image. Pressing the GRAPHIC key causes a like blanking and revival of the graphic data image.

A printout of an image, be it a composite image or not, is obtained by pressing the PRINT key 19e and moving the cursor to a selection box next to the document desired to be printed. Pushing the EXECUTE key brings a formatted message to the screen which asks the user to specify the number of pages, type style and like information. The next depression of the EXECUTE key or the PRINT key sends the data to the printer where the image is recorded on paper or other appropriate substrate.

Transmitting a document to another terminal proceeds in a similar fashion. Hitting the SEND key calls the image of the file index to screen 18. The cursor is moved to a specific selection box, e.g. one of the boxes 22a-e, and the EXECUTE key is touched. A message in a prescribed format appears on the screen requesting the address or access number of the terminal that is to receive the document. When this information is keyed in, and the EXECUTE key is pressed, the transmitting terminal initiates the routines necessary to effect the transfer of the data. Before the transfer can occur, however, the operator at the addressed terminal must depress the RECEIVE key 19b or the terminal must be in an automatic receive mode of operation.

The document is transmitted when the foregoing conditions are met. The receiving terminal, as a consequence of having the RECEIVE key depressed or of being in an automatic receive mode, adds the document title, author and date associated with the received message to the file index for that terminal. Also, the T/G block in the index is filled according to the content of the transmitted document. The identity of the sending terminal is displayed in the AUTHOR column along with the name of the author as appears on the file index in the transmitted terminal. If the transmitted document is a composite, the file index does not include a separate listing for the individual text and graphic data documents that make up the composite image. Nonetheless, the text and graphic data images can be viewed separately by the operator actuation of the TEXT and GRAPHIC keys to alternately blank and re-display the text and graphic image portions of the composite document.

Figure 2:
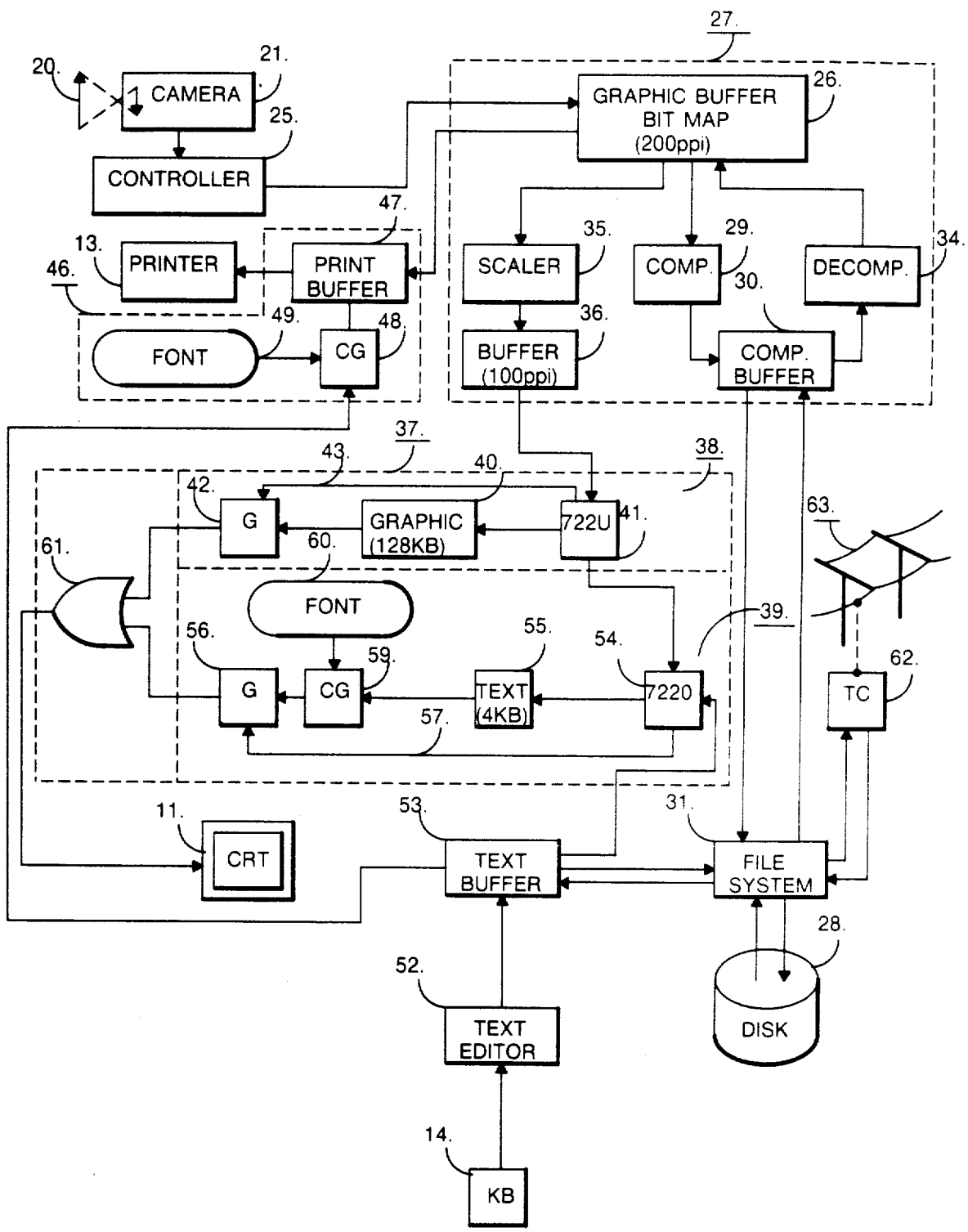
FIG. 2 is a schematic diagram of the data flow within the terminal of FIG. 1 and represents both software and hardware used by terminal.

Turning now to FIG. 2, the general hardware and software architecture of the communication terminal of this invention will be described in relation to the data flow within the terminal. Like components in the different figures are given the same reference numbers. Graphic data is generated by camera 21 optically scanning the object or target 20. The presently preferred camera is a device of the type like the Electronic Camera, model C3222 available from Data Copy Inc. of Sunnyvale, Calif. Briefly, it uses a linear CCD array that is moved across the image plane of the camera's lens effecting a line by line scan of the target 20. Lighting is provided by flood lamps 22 (FIG. 1) encircling camera 21 and positioned to direct light onto the surface of the target 20 facing the camera's lens.

The CCD array is made up of a 1728 photoresponsive CCD elements that are loaded in parallel with graphic data by the line or slit image projected onto the array at the instance the array is gated by a clock pulse. The CCD elements respond generally linearly to the intensity of the incident light on each of its elements. Of course, each of the 1728 elements represent a pixel in the raster scan image of the target.

The 1728 elements of the CCD array, prior to the arrival of the next gate pulse, are serially read out of the array and are amplified and fed to an analog to digital (A/D) converter located at the camera. The A/D converter serially transforms the analog signal associated with each CCD element into an eight bit binary number. The 0–255 binary counts approximate the continuous tone possibilities of optical density of each pixel in the target 20. The present embodiment of terminal 10 seeks only to deal with two tone levels, basically, a black mark on a white background or some other desired contrast. The 0–255 numbers are thereafter threshholded with a density level, e.g. that represented by count 128. Optical reflection densities below that count are represented as white, for example, and densities above that level are represented as black, for example. The threshhold level itself is dynamically adjusted based on the amount of background noise associated with the target.

The one bit representation of the optical reflection density is serially fed from the dynamic threshholding device to a shift register in the camera controller 25. The shift register is serially loaded but is read out to the graphic data buffer or bit map 26 in parallel a byte at a time. The shift register is functionally a FIFO buffer where FIFO is an acronym for the first in, first out order of data flow. The FIFO is used to accommodate differences in the camera speed and the clock rates and duty cycles elsewhere within terminal 10.

The use of one bit rather than eight bit graphic data to represent each pixel greatly simplifies the present terminal. It means that the graphic data most accurately represents line copy originals such as printed or handwritten text or sketches and simple charts and graphs. These, of course, are the materials most prevalent in the office environment.

During intervals between clock signals, the CCD array is displaced one scan line or row to position it at the next row in the raster image. The CCD elements are cleared and a new line of pixels is loaded into the elements by the projection of the new slit image when gated by the next clock pulse. The camera creates graphic data for a raster image over an 8×10 inch area of the target 20, referred to as a page, at a horizontal and vertical resolution of 200 pixels per inch (ppi). A full raster image represented by the graphic data produced by the camera includes 1728 pixels per row and 2048 rows. This is a full page of graphic data. The printer 13 reproduces the full page 1728 pixel by 2048 row raster image. In contrast, in the present embodiment, the monitor 11 only displays about one-half page of graphic data in an 800×600 pixel raster pattern which is lower resolution image which is discussed more fully below.

The graphic data is sent from the camera controller 25 into bit map or graphic buffer memory 26 of the buffer-compressor section 27. The bit map is resident in a portion of a 512 kilobyte (KB) RAM memory. The 1728×2048 raster image includes about 442 KB pixels which when combined with timing and control bits approaches 500 KB. Collectively, a single scan of a target 20 generates an amount of graphic data that nearly consumes the capacity of the 512 KB RAM. The data associated with a scan represents a page of graphic data. The transfer from controller 25 to bit map 26 occurs one byte at a time via direct memory access (DMA) employed by the terminal. The incoming graphic data is displayed at monitor 11 and, if the operator elects, is routed from graphic buffer 26 directly to disk drive 28. Disk 28 has a 6.3 megabyte (MB) capacity enabling it to store up to about twelve full pages of graphic data if not compressed. To display or print an image represented by the graphic data, the data is fetched from the disk and routed back through buffer 26 to the raster scan printer 13 or the CRT 11. The graphic data can be displayed while it is being printed out.

The graphic data in buffer 26 is compressed prior to its storage at disk 28. The compression is performed by data compression means 29 and consists of run length encoding the horizontal or row data for one dimension compression. Two dimension compression is achieved by coding the differences in data between adjacent rows. The compressed data is temporarily stored in compression buffer 30 prior to being routed to disk 28. The file management of documents on disk 28 is handled by the file system of the terminal computer. The file system is part of the commercially available operating system software of the Micro Soft Corporation called Micro Soft Disk Operating System, (MSDOS), a tradename. The file management system portion of MSDOS is represented by block 31 in the diagram of FIG. 2.

To display an image represented by graphic data, the graphic data is read from disk under file system into the compression buffer 30. The graphic data is decompressed by the decompression means 34 by the inverse process of the compression scheme and fed back to the graphic data buffer 26. The 200 ppi resolution data in buffer 26 is reduced to a 100 pixel per inch horizontal and vertical resolution by the scaler means 35 and is routed into the 100 ppi buffer 36. Scaler means 35 reduces the resolution of the graphic data by discarding odd pixel data in all odd numbered rows of the raster image and by discarding all even rows of data. Effectively, three out of four adjacent pixels in adjacent rows are discarded.

The functions represented by buffer-compression section 27 are performed both by hardware and software. The graphic buffer or bit map 26, and buffer 30 and 36 are formed in segments of the terminals memory (128 KB RAM and 512 KB RAM as described below). The transfers indicated by the arrows interconnecting the boxes within section 27 are data program transfers. The scaller 35, compression means 29 and decompression means 34 are implemented with hardware.

The 100 ppi graphic data is routed to the CRT 11 through the monitor controller 37. Controller 37 comprises hardware and its own software and includes a graphic data section 38 and a text data section 39. The graphic data is entered into a 128 kilo byte (KB) buffer 40 under the control of a Nippon Electric Corporation (NEC) uPD 7220 Graphic Data Controller 41. The 7220 processor also controls the application of the graphic data in buffer 40 to the CRT via gate and logic means 42 under its control over line 43. The CRT 11 is selected for 100 ppi image resolution to enable lower cost monitors such as found in personal computers to be used in the terminal 10. Obviously, if 200 ppi or some other resolution is desired for a given application, an appropriate CRT should be selected.

The 200 ppi graphic data in the graphic data buffer 36 is printed out at 200 ppi horizontal and vertical resolution by printer 13. The present embodiment of communication terminal 10 offers 200 ppi resolution only at the printer to enable a lower resolution monitor to be used. This makes for system compatibility and results in savings to the terminal since a 200 ppi CRT need not be acquired. However, having the 200 ppi printer 13 still enables the terminal to make the graphic information visually available at the 200 ppi resolution via the printer when a given situation requires it.

The graphic data is applied to printer 13 through the printer output section 46. Section 46 has a buffer memory 47 that receives the graphic data from the graphic data bit map 26 under software program transfer. Similarly, text data is applied to buffer 47 by program transfer in the proper form and location after being processed by a character generator 48 set with a specific font chosen from a font library means 49. Generator 48 and font 49 are implemented in software. A printer controller 46a (FIG. 4) is a hardware interface for coupling the data to the printer.

Printer 13 is a thermographic printer of the type such as the Microplot 80, a tradename, available from Gulton Industries, Inc., Graphics Instrument Division, East Greenwich, R.I. 02818. The printer head burns dark marks on a specially coated white paper to make a visible image. The writing head of the printer extends across the 8.5 inch width of a sheet of paper 17 (FIG. 1) in the printer 13. The head is made up of 1728 resistive heating pads. The resistive pads are adjacent to the paper and are roughly the size of a pixel. A pad is heated, by current, to a temperature level that burns, i.e oxidizes, the paper to turn it black, i.e. a high optical reflecting density mark is made on the lower density face of the paper. The paper is transported relative to the array of resistive heating pads to enable the multiple rows of a raster image to be constructed. The printer includes a microprocessor that controls the operation of the printer and which handles the receipt of graphic data in byte quantities. The printer is capable of printing an 8.5×11 inch page of graphic data in about 60 seconds.

Text data is entered into the terminal 10 in several ways including through the electronic keyboard 14. The keyboard is of standard design and includes the standard complement of keys used on a typewriter keyboard plus several function keys including keys 19a–h and other keys discussed in connection with FIGS. 6a and 6b. As described earlier, there are also cursor keys for controlling the position of a cursor image on the CRT's screen. The keyboard has a microprocessor to control its functions and to interact with the terminal cpu through a universal asynchronous receiver transmitter. This is discussed more fully later.

Functionally, the text data generated by actuation of the keys is processed by the word processing or text editing means 52 which is part of the system application software and which executes the steps described in connection with FIGS. 6a and b. The text data is routed into the temporary text data buffer 53 which is part of the terminals memory. Buffer 53 holds enough text data to support the capacity of the display which in this embodiment is twenty five lines of eighty characters, about one-half page. The text data in buffer 53 is fed to the CRT 11 after each keystoke. The path to the CRT is through the text data section 39 of the monitor controller 37. The text data is routed by a uPD 7220 graphic data controller 54 into the text buffer 55. The gate and logic means 56 is under control of processor 54 via line 57 and in turn controls the flow of text data (converted to a raster format) to the CRT. The conversion of the coded data to raster image or bit map form is performed by the character generator 59 in the text data section of the controller. The font for the data is established by the controller font library 60. A logical OR operation represented by OR gate 61 couples the graphic data, text data or a combination thereof to the CRT 11. The text processor 54 and graphic processor 41 communicate via lines 58 and mutually control the writing of graphic and text data onto the screen 18 of CRT 11. Text data has priority over graphic data when images represented by the two overlap.

The text data in buffer 53 is routed to storage on disk 28 via file system 31. As explained in connection with FIGS. 6a and b, the text editor 52 causes the generation of user prompts on the CRT screen 18 when the FILE key 19c is pressed. For one, the operator is required to type in a title and name of the author file to add the document to the file index. The file index also notes that the document is made up solely of text data. Similarly, to file graphic data, the operator must type in a name for the graphic document 20 placed in front of the camera 21. This name is also added to the file index. A composite document is added to the file index in a similar fashion as explained in connection with FIGS. 6a and b. A display or printout of any of the stored text, graphic or composite documents is achieved by the actuation of the RETRIEVE 19d and PRINT 19e keys and the cursor selection of a desired document. This was described in the discussion of FIGS. 6a and b.

Two communication terminals 10 exchange text and graphic data via a telecommunication controller (TC) 62. TC 62 is a microprocessor controlled device that retrieves and transmits a given document from storage on disk 28 via file system 31 and the terminal DMA whether it is text data, graphic data or a combination of the two. The TC is given the addresses of the data, including header information, on disk 28 and via DMA pulls it into its memory in two byte quantities. Thereafter, the data is serially transmitted from the TC onto a communication medium, e.g. a local area network such as Wanget available from the assignee of the present invention, represented in FIG. 2 by the telephone lines 63. The TC 62 of the receiving terminal loads the serially transmitted data into registers and transfers the data a byte at a time to the disk 28 via file system 31. The receiving terminal updates its document file index to add the name of the received document and the terminal from which it was received.

Figure 3:
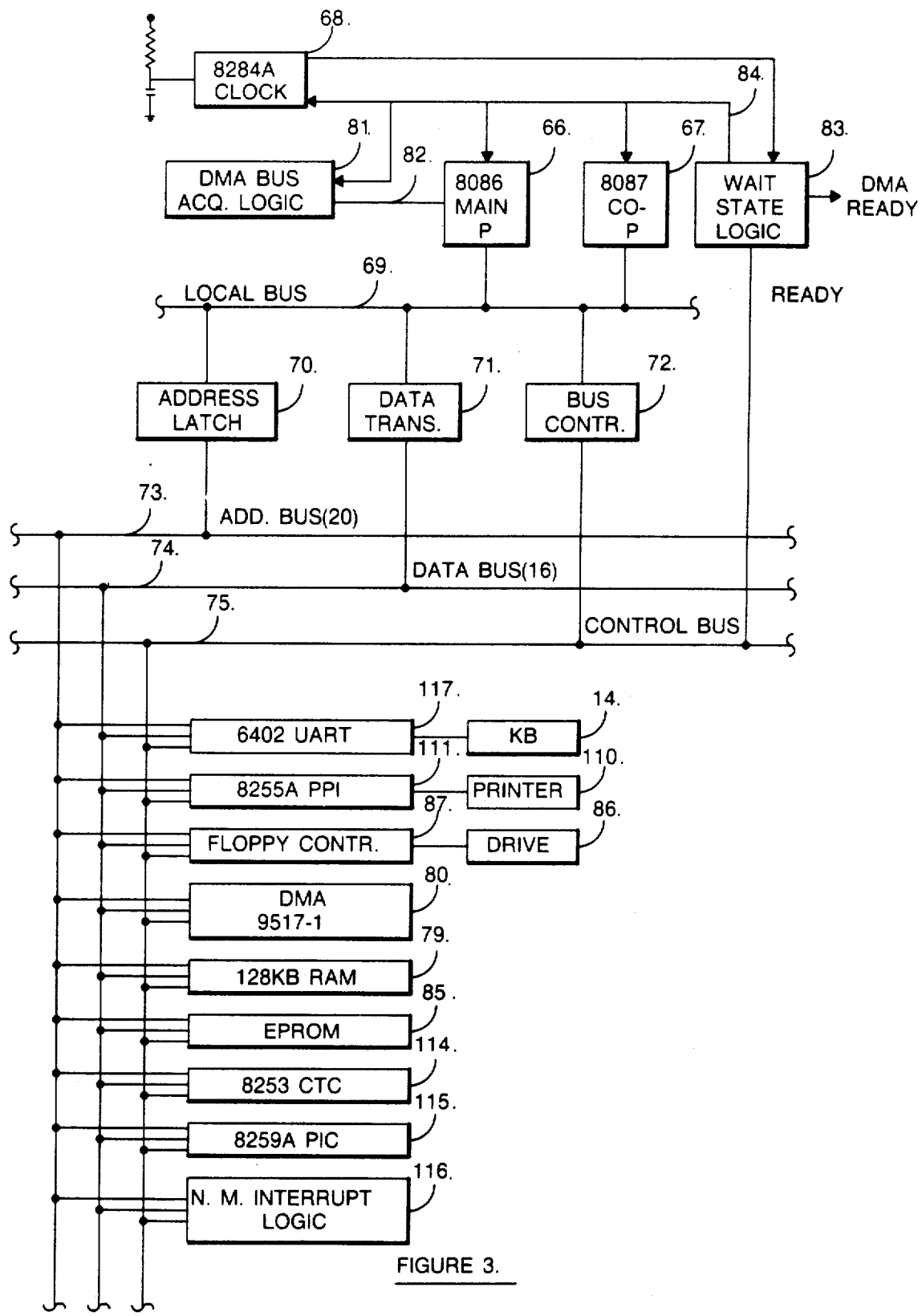
FIG. 3 is a schematic block diagram of the personal computer portion of the terminal of FIG. 1.

Turning now to FIG. 3, the system described in connection with FIGS. 1 and 2 is under control of CPU 66 and its co-processor 67. The CPUs are Intel Corporation 8086 and 8087 microprocessors respectively. The balance of the apparatus shown in FIG. 3 substantially constitute the functional components of the Professional Computer which has been transformed into the present communication terminal. The system clock 68 provides the requisite clock pulses to the system enabling it to operate at 8 megahertz (MHz). The CPUs 66 and 67 communicate with each other over the local interprocessor bus 69 and they communicate with memory and the system input and output (I/O) devices across the twenty line system address bus 73, the sixteen line data bus 74 and the multiple line control bus 75. Communication between the CPUs and the buses is by means of the address latch 70, data transceiver 71 and bus controller 72 which are also Intel Corporation chips.

The CPU uses two different types of addressing: memory mapped addressing and I/O mapped addressing. CPU memory reference instructions in microcode generate memory mapped addresses. Direct memory access (DMA) reference instructions also generate memory mapped addresses. Input and output instructions in microcode generate I/O mapped addresses that identify I/O ports. All addressable devices are designed to respond to a memory mapped address or an I/O port address. In general, however, addresses on I/O circuit boards in console 15 (FIG. 1) are I/O mapped because I/O ports are identified in terms of the circuit board connectors or slots in which circuit boards are installed. When a circuit board contains memory mapped addresses, those addresses remain the same no matter which connector in console 15 the circuit board is installed. The memory mapped address must be reserved for their intended purpose or disabled by special circuitry when they are not needed. There are a host of memory reference instructions available for accessing memory mapped address but a limited number of I/O instructions to access I/O ports.

Although DMA has no connection with address mapping, DMA transfers must be initiated by an I/O mapped device and the I/O mapped device must exchange data with a memory mapped device. It is not possible to perform DMA transfers between two memory mapped devices or two I/O ports. Except for the keyboard 14, DMA transfers are used with all the major terminal devices including the monitor 11, printer 13, camera 21, disk drive 28 and TC 61.

The computer's memory includes the 128 KB dynamic RAM 79 which is used (along with additional memory identified later) to store the MSDOS operating system, the application program for the terminal 10 and data. The RAM is comprised of 16 64K-bit RAM chips having a 200-nanosecond (ns) access time and a 350 ns cycle time. The CPU's 66 and 67 must complete a memory cycle before it releases the buses to the DMA controller 80. The DMA controller 80 is prevented from seizing the buses by the request/grant pulse coupled to the DMA bus acquisition logic 81 via line 82. DMA logic 81 is coupled to the DMA controller via the control bus 75, the system wait state logic 83 and line 84.

The EPROM 85 provides 16 KB of boot strap ROM. EPROM 85 contains the program enabling operation and application software to be loaded into RAM memory 79 from a diskette on floppy disk drive 86. In addition, text and graphic data can be transferred to diskette when desired and the diskette can be transferred to another terminal 10 to load text and graphic data. In that situation, the diskette and drive comprise a text and graphic data generator. The floppy disk controller 87 controls the operation of the drive 86. The storage capacity of the diskette employed is 312 KB.

The DMA controller 80 makes a system bus request when it recognizes that one of its DMA request lines has been asserted. Once the DMA controller gains control of the buses, the CPU's 66 and 67 do not start their duty cycle until the buses are released by the DMA controller. The device that initiated the DMA request is always an I/O mapped device, e.g. the camera controller 25 or TC controller 61 and the address placed on the address bus 73 by the DMA controller is always a memory mapped address. The I/O mapped device responds to a DMA acknowledge pulse and reads or writes data onto or off of the data bus 74. The memory mapped device recognizes its address on the address bus, put there by the DMA controller and the device reads or writes onto or off of the data bus. The DMA controller controls the direction of the transfer, under the direction of the system, as well as the application software. The lowest memory mapped address involved in the transfer, and the number of bytes to be transferred to successively higher byte addresses.

Figure 4:
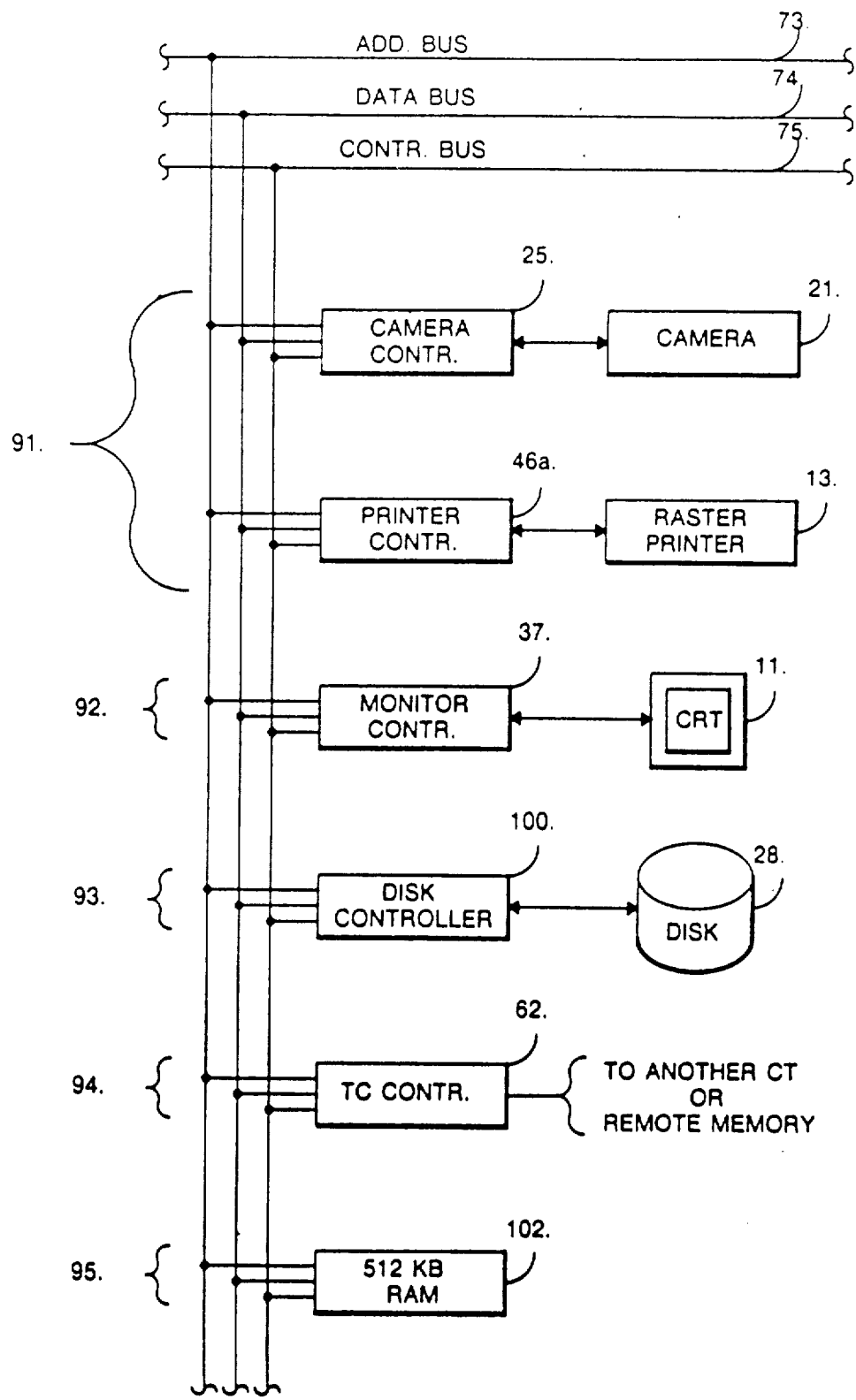
FIG. 4 is a schematic block diagram of the components combined with the computer of FIG. 3 to make up the communication terminal of FIG. 1.

The components illustrated in FIG. 3 comprise the computer portion of terminal 10 that is available for computational functions along with the above described text and graphic display and print functions. The computer components of FIG. 3 are resident on a single circuit board mounted in one of six circuit board connectors or slots in the console 15 (FIG. 1). The remaining five slots are called expansion slots. The specific circuit boards inserted into the five expansion slots are indicated in FIG. 4. The components in FIG. 4 are coupled to those of FIG. 3 by means of the system buses: address 73; data 74; and control 75. The buses 73-75 are made available to the five expansion connectors or slots by a mother board that also carries power from a separate power supply, not shown, and other interconnecting conducting lines and connectors. The five expansion slots are represented in FIG. 4 by the five brackets 91-95 which depict the particular I/O devices resident on the five circuit boards.

Slot 91 couples the camera controller 25 and the printer controller 46a to the system buses 73-75. These controllers were described in connection with the discussion of FIG. 2. The printer controller applies either or both the text and graphic data to the printer. The camera controller provides power and timing information to the camera 21 and receives the serial graphic data and retransmits it in byte quantities.

Slot 92 couples the monitor controller 37 to the system buses. The monitor controller was also discussed in connection with FIG. 2. It is the I/O device for the CRT 11 and includes means for applying either or both text and graphic data to the monitor.

Slot 93 couples the disk controller 100 to the system buses and, of course, is the I/O device for reading and writing text and graphic data from and to disk. The disk drive 28 is a 6.3 megabyte (MB) Winchester disk drive which has its read and write operations to a recording disk directed by the controller 100.

Slot 94 couples the TC controller 62 to the system buses 73-75. It too was discussed in connection with FIG. 2. TC61 includes a Z80 microprocessor and serial input and output (SIO) chip both from the Zilog Corporation. The TC controller is coupled to appropriate modems, when necessary, or other communication line equipment represented by the telephone lines 63 in FIG. 2 and output line 101 in FIG. 4. The TC controller is designed to accept text and graphic data in parallel format from the data bus 73 and to synchronously shift the data out to the communication medium 63. During reception of data from line 63, the TC controller accepts synchronous serial data and transfers the data to the graphic data buffer 26 (FIG. 2) in two byte quantities via the data bus 73.

Slot 95 couples an additional 512 KB of memory provided by RAM 102 to the 128 KB RAM 79 on the CPU board shown in FIG. 3. The two dynamic RAM's together provide the space for MSDOS, system application software, a basic input and output system (BIOS), i.e. hardware interface, software and the various buffers described in connection with the description of FIG. 2.

Returning to FIG. 3, terminal 10 is also a Professional Computer and it supports a serial character printer 110 such as a daisy wheel printer of the type described in U.S. Pat. No. 3,954,164. The I/O device for printer 110 is the parallel port interface (PPI) chip 111 available from Intel Corporation under the chip number 8255A.

The Intel Corporation chips 114 and 115 are respectively the counter and timer chip (CTC) 8253 and programmable interrupt chip (PIC) 8259A both available from Intel Corporation. The CTC provides programmable clock pulses to the various system components.

The PIC provides eight levels of maskable priority interrupts to CPU 66 and 67. The interrupts are made available to those I/O devices that need the CPU's attention. The PIC monitors all eight interrupt lines on the central bus 75 and keeps track of which lines are carrying active interrupt requests. When any interrupt request line is active, the PIC asserts its pending interrupt output. To acknowledge that it is ready to service a pending interrupt, the 8086 CPU returns acknowledge pulses to the PIC.

The non-maskable interrupt logic 116 is under the constant control of CPU 66 and 67 to seize control of the system buses whenever a parity error or I/O error is detected. Logic 116 detects the error and causes an initialization of a process when errors are detected.

The detached keyboard 14 contains its own microprocessor, a Z80 from the Zilog Corporation, that accepts commands from the CPU 66 and returns keyboard status data on keystroke or text data. The CPU 66 sends command data to the keyboard by writing a sequence of command bytes to a given I/O port. When the keyboard returns status or keystroke data, the CPU 66 reads it from the same I/O port. The keyboard data is sent and received simultaneously across the full-duplex keyboard interface. Interface 117 is a Motorola Corporation 6402 universal asynchronous receiver transmitter (UART) chip.

After sending or receiving data, the UART 117 generates an interrupt request. The basic input output system (BIOS) software, discussed later, examines the appropriate bit positions in the interrupt port to identify the keyboard as the source of the interrupt request and to determine which keyboard function made the request, e.g. request to send or receive data. This is typical of BIOS operation for other user interface hardware.

Pressing a key 19 (FIG. 1) causes the keyboard to send an eight bit keystroke code to CPU 66. Each key has its own unique keystroke code which is arbitrary and bears no relationship to any of the various standard character codes. The shift keys produce release codes which alter the normal key code by setting the high order bit.

Figure 5:
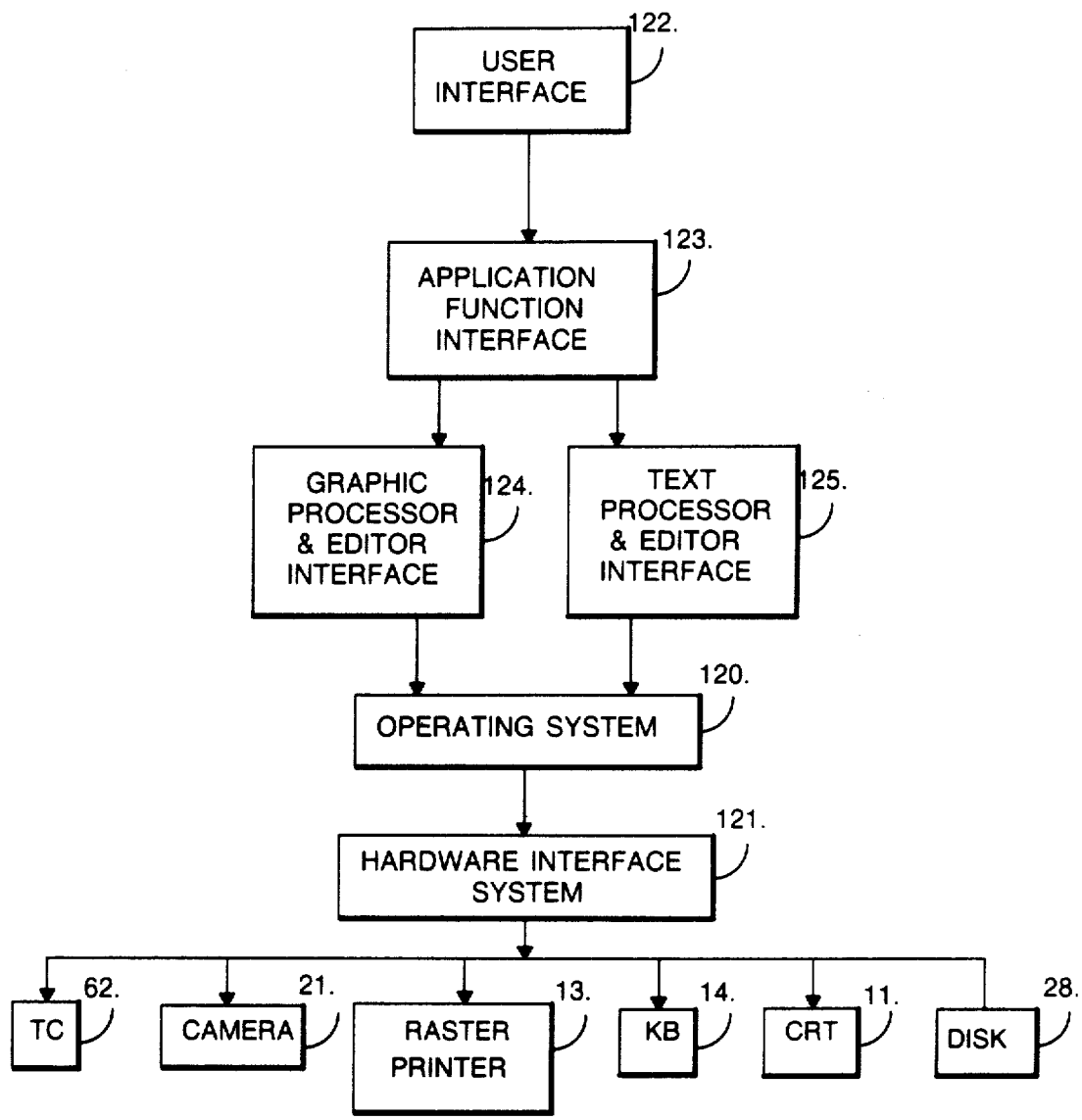
FIG. 5 is a diagram illustrating the relationship of the communication terminal application software to the computer's operating system software and the relationship of both the application and operating system software to the various hardware components of FIGS. 2, 3 and 4.

The structure of the system software that controls the operation of terminal 10 including the operations described in connection with the discussions of FIGS. 1 and 2 is depicted in FIG. 5. The software is resident in the two RAM's 79 (FIG. 3) and 102 (FIG. 4). The system's operating system is the commercial MSDOS system represented as operation system 120. All the devices in the system are operated under the control of MSDOS through the hardware interface (BIOS) system that is a universal interface between MSDOS and hardware. The BIOS software can adapt to the substitution of one vendor's disk drive for another on a transparent basis to MSDOS. The MSDOS file system 31 shown in FIG. 2 as coupled directly to the disk 28 is in fact coupled through system 121. The file system 31 is a file management subroutine within MSDOS 120.

The application software, written in C language, that orchestrates the functions and operations of terminal 10 is represented by the blocks 122-125. The communication terminal (CT) user interface software 122 contains all the routines that are associated with a Professional Computer for interacting with the user by means of display on monitor 11 and status lights and the like on the various hardware associated with the Professional Computer including the keyboard 14, CRT 11 and disk 28. In addition, interface 122 contains the routines for user interaction with the hardware and functions unique to the terminal 10 which include the telecommunication interface, TC 61, the camera 21, and the raster image printer 13.

The routines represented by block 122 look toward interfacing with the user. The block 123 in turn looks toward interfacing with the software 122 and to executing the text editing and other functions of a Professional Computer. The text editor 52 discussed in connection with FIG. 2 is part of block 123. In addition, the software of block 123 performs the additional editing functions required for a terminal 10 including those required to include composite document names on the document file. At this point in the software architecture, two separate routines are provided for graphics and text. The graphics processor software 124 includes routines for interfacing with the solvent 123. It also includes the routines necessary to develop the specific commands that will cause the MSDOS operating system 120 to execute specific graphic actions. Similarly, the text processor software 125 includes routines for interfacing with the editor software 123. It also includes the routines necessary to develop the specific commands (i.e. addresses) that will cause MSDOS 120 to execute specific text actions.

As explained earlier, MSDOS 120 and BIOS 121 are the operating system that carries out the functions requested of it by the graphic and text processors 124 and 125. It does so by activating those routines in BIOS 121 that interface with specific hardware to effect their operation including the interchange of data. This includes, of course, the hardware 62, 21, 13, 14, 11 and 28 shown coupled to the hardware interface system 121.

Various modifications and variations of the foregoing described invention are obvious to those skilled in the art. Such modifications and variations are intended to be within the scope of the present invention. The embodiment described is representative of a multitude of variations without changing the essence of the system operation. For example, the specific file index shown in FIG. 6a and the function keys in FIG. 6b may be reformatted or renamed without changing the basic operation of the system. Another example would be a system wherein the buffer and compression means 27 shown in FIG. 2 is replaced solely by the graphic buffer. The system in this case does not include compression of graphic data for storage on the disk 28 or the reduction of its resolution for display on a monitor having a lower resolution than the printer 13.

What is claimed is:

1. A data processing terminal comprising
    a camera including graphic data generator means for scanning a target for generating graphic data representative of the binary bit pattern associated with a raster image of the target, and an input device including text data generator means for generating coded text data representative of information symbols,
    mass storage means for storing said text and graphic data, and monitor means and raster image printer means for displaying and printing, respectively, images in response to said graphic and text data,
    graphic data buffer means electrically coupled to the graphic data generator means, the printer means, the monitor means and the mass storage means for storing, short term, graphic data received from the graphic data generator means and from the mass storage means and for supplying graphic data to the printer means and monitor means,
    text data buffer means electrically coupled to the text data generator means, the printer means, the monitor means and the mass storage means for storing, short term, text data received from the text data generator means and mass storage means and for supplying text data to the printer means and monitor means, and
    a central processing unit (CPU) programmed to respond to commands from the input device to process text data and to control data flow to and from the graphic data buffer means, the text data buffer means and the mass storage means while maintaining an association between separately stored blocks of graphic data and text data to be displayed or printed as a composite image, the CPU being programmed to control the application of text data from the text data buffer means and associated graphic data from the graphic data buffer means to the monitor means and the printer means for respectively displaying and printing images created from a combination of the text data and the associated graphic data.

2. The terminal of claim 1 further including telecommunication means for coupling the terminal to a transmission medium for transmitting graphic data, text data and a combination of the two between local and remote terminals to display and print images created from graphic data, text data and a combination of the two with data residing at the local and remote terminals.

3. The terminal of claim 2 wherein said telecommunication means is coupled to the mass storage means of the terminal.

4. The terminal of claim 1 further including graphic data compression means for compressing the graphic data from the graphic buffer means prior to storage by the mass storage means and decompression means for decompressing graphic data retrieved from the mass storage means to the graphic buffer means.

5. The terminal of claim 1 further including scaler means for reducing the resolution of graphic data received from the graphic data buffer means before its application to the monitor means.

6. The terminal of claim 5 wherein the resolution of images displayed by the monitor means is less then that of images printed by the printer means.

7. The terminal of claim 5 wherein the scaler means reduces the resolution of the graphic data from about 200 ppi to about 100 ppi.

8. The terminal of claim 1 wherein said graphic data generator means includes a CCD array having a plurality of photosensitive elements corresponding to the number of pixels in a row of the raster image defined by the graphic data.

9. The terminal of claim 1 wherein the printer means includes a thermographic printer having a plurality of heating pads for marking a record medium.

10. The terminal of claim 1 wherein the text data generator means is a keyboard means having keys associated with different information symbols.

11. An office information system communication method comprising the steps of, at a local terminal:
generating graphic data representative of a raster image of a target document and text data representative of information symbols,
temporarily storing the graphic and text data in graphic and text data buffers respectively following the creation of the data and before applying the graphic and text data to mass storage means,
storing the graphic and text data in the mass storage means while maintaining an association between separately stored blocks of graphic data and text data to be displayed or printed as a composite image,
applying the graphic data to a raster image monitor means from the graphic data buffer means and applying the text data to the monitor means from the text data buffer means for displaying images created from text data, graphic data and a combination of the two, and
applying the graphic data to a raster image printer means from the graphic data buffer means and applying the text data to the printer means from the text data buffer means for printing images created from text data, graphic data and a combination of the two, and
transmitting between the local terminal and a remote terminal associated text data and graphic data and at the local and remote terminals displaying and printing images created from text data, graphic data and the combination of the two residing at the local terminal and at the remote terminal.

12. A data processing terminal comprising:
primary memory including separate graphic data map storage and text data storage,
a camera coupled to the primary memory for viewing a document and generating graphic data representing the binary bit pattern associated with a raster image of the document, the graphic data to be stored in the graphic data map storage,
an input device including text generator means coupled to the memory for generating text data representing information symbols, the text data to be stored in the text data storage,
a monitor coupled to the primary memory for displaying data from the graphic data map storage and from the text data storage,
a central processing unit (CPU) programmed to respond to commands from the input device to process text data from the text data storage, to control data flow to and from the primary memory and to control superimposed display by the monitor of graphic data from the graphic data map storage and text data from the text data storage.

13. The terminal of claim 12 further comprising disc storage for storing graphic data and text data, the CPU maintaining an association between separately stored blocks of graphic data and text data to be displayed or printed as a composite image.

14. The terminal of claim 13 further including compression means for compressing or decompressing graphic data for storage and retrieval of graphic data to and from the disc storage.

15. Terminal of claim 12 further including printer means coupled to the memory for printing an image created from text data, graphic data and combinations thereof.

16. A data processing terminal comprising:
primary memory including separate graphic data map storage and text data storage,
a camera coupled to the primary memory for viewing a document and generating graphic data representing the binary bit pattern associated with a raster image of the document, the graphic data to be stored in the graphic data map storage,
an input device including text generator means coupled to the memory for generating text data representing information symbols, the text data to be stored in the text data storage,
a monitor coupled to the primary memory for displaying data from the graphic data map storage and from the text data storage,
telecommunications means for coupling the terminal to a transmission medium and transmitting and receiving text data and graphic data, and
a central processing unit (CPU) programmed to respond to commands from the input device to process text data from the text data storage, to control data flow to and from the primary memory, to control superimposed display by the monitor of graphic data from the graphic data map storage and text data from the text data map storage and to control transmission and reception of text data and graphic data through the telecommunication means while maintaining an association between separately transmitted blocks of graphic data and text data to be displayed or printed as a composite image.

17. The terminal of claim 16 further including printer means coupled to the memory for printing an image created from text data, graphic data and combinations thereof.

* * * * *